INVENTORS.
BRUCE D. JIMERSON
ROBERT H. MOORE

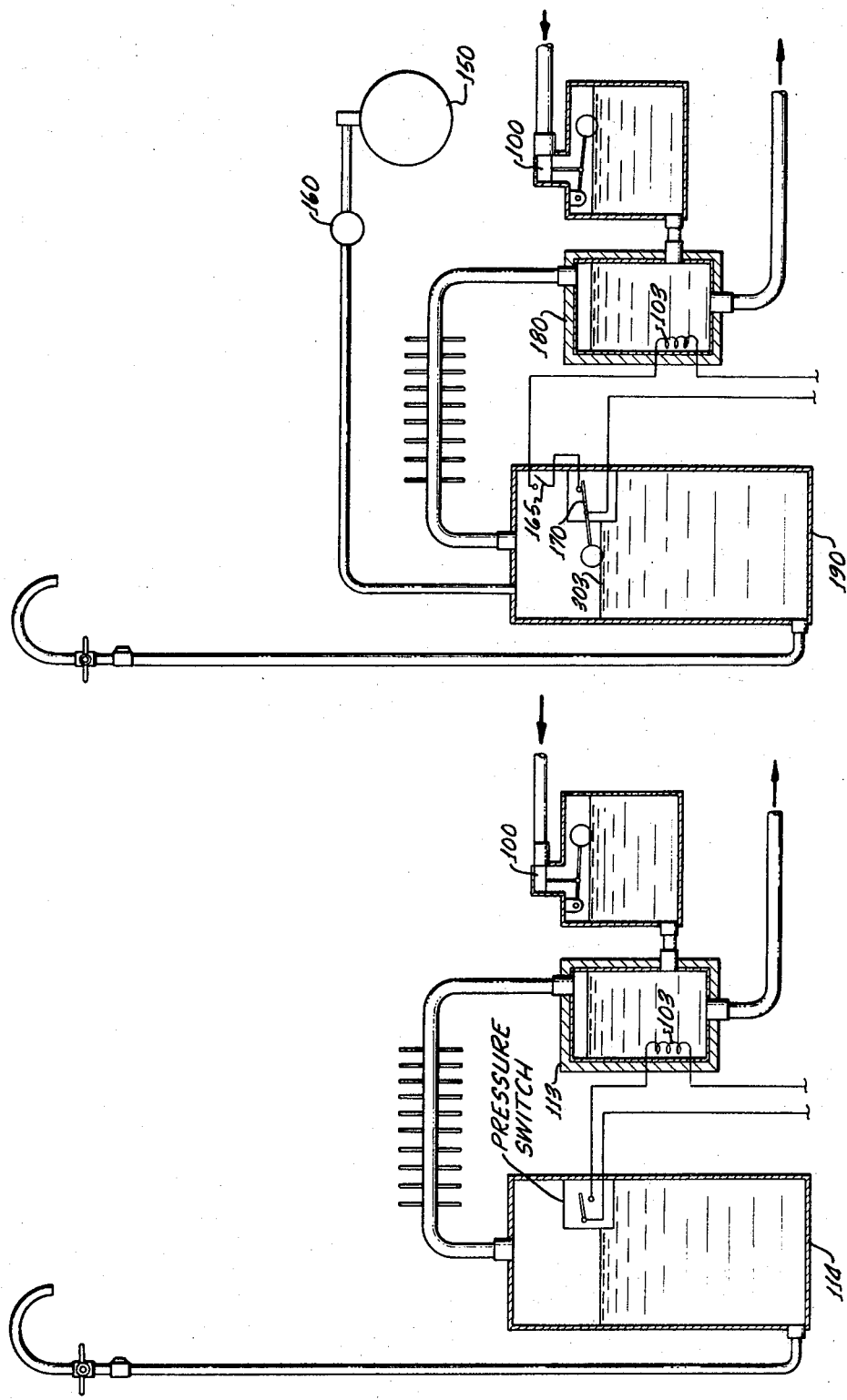

United States Patent Office 3,687,817
Patented Aug. 29, 1972

3,687,817
HOUSEHOLD WATER DISTILLATION SYSTEM
Bruce D. Jimerson, 1815 Vallecito Drive, San Pedro, Calif. 90732, and Robert H. Moore, 815 N. 52nd St., Phoenix, Ariz. 85005
Filed May 25, 1970, Ser. No. 40,186
Int. Cl. B01d 3/42
U.S. Cl. 202—181    6 Claims

ABSTRACT OF THE DISCLOSURE

A heating element controlled by a level detecting switch can be used to provide the basic vapor-liquid phase relationship in a fully automatic apparatus for providing distilled water directly from a tap water line. The water line pressure can be used to provide energy for drawing off the purified water and for discharging the residue.

BACKGROUND OF THE INVENTION

In recent years the sale of bottled distilled water has increased sharply. A paramount reason for this is due to the concern of a pollution conscious public which is no longer willing to consume the salts, chlorine, insecticides and other contaminates which are present in what is commonly known as tap water. A secondary reason for the skyrocketing sales of distilled bottled water is due to new household uses, as for example in steam irons or the home photography lab, or in making crystal clear ice cubes, etc.

An important factor to the average consumer of bottled water lies in the cost and inconvenience of obtaining it. If the water is purchased from the local store in small one gallon bottles, it must be carried home and in most cases the bottle must be returned. Water delivery service by truck is expensive. In addition, space is required for both the water cooler and the replacement bottles. Soft water units are of course expensive, and are designed to remove only minerals. Filters are expensive, only partially effective, and require frequent replacement, particularly where the water is highly contaminated to start with.

What is actually desired is a household distillation unit which will supply, upon demand, a limited quantity of distilled water. Although portable stills have been available for some time, these devices typically require several manual operations, viz., the boiler must, prior to the need for the distilled water, be filled with tap water and plugged in for several hours, after which a quantity of distilled water is available. The boiler must then be cleaned, and possibly loaded with tap water for another distillation process, etc. To the average housewife who is accustomed to the convenience of automatic stoves, dishwashers, and hot water heaters, such devices have not been popular. Accordingly, a primary object of the present invention is to provide an automatic household water distillation system.

Another object of the present invention is to provide an inexpensive and maintenance free distillation unit.

It is a further object of the invention to provide a self-cleaning distillation system for removing residue impurities during the normal cycle of household water use.

It is another object of the invention to provide a distillation system which is directly connected to a tap water line.

It is another object of the invention to provide a distillation system wherein the vapor-liquid balance is maintained by regulating the power to the thermal element in accordance with the liquid level.

Other objects and advantages of the present invention will be obvious from the detailed description of a preferred embodiment given hereinbelow.

DESCRIPTION OF THE DRAWINGS

FIG. 2 shows the state of the operative elements of the water system when the household water is initially turned on.

FIG. 5b shows another embodiment of the systems utilizing a pressurized air tank and regulator to maintain equilibrium pressure.

FIG. 6 shows how the system in FIG. 5 can be simplified to use the heater to maintain system pressure.

DESCRIPTION OF A PREFERRED EMBODIMENT

Figure 1:
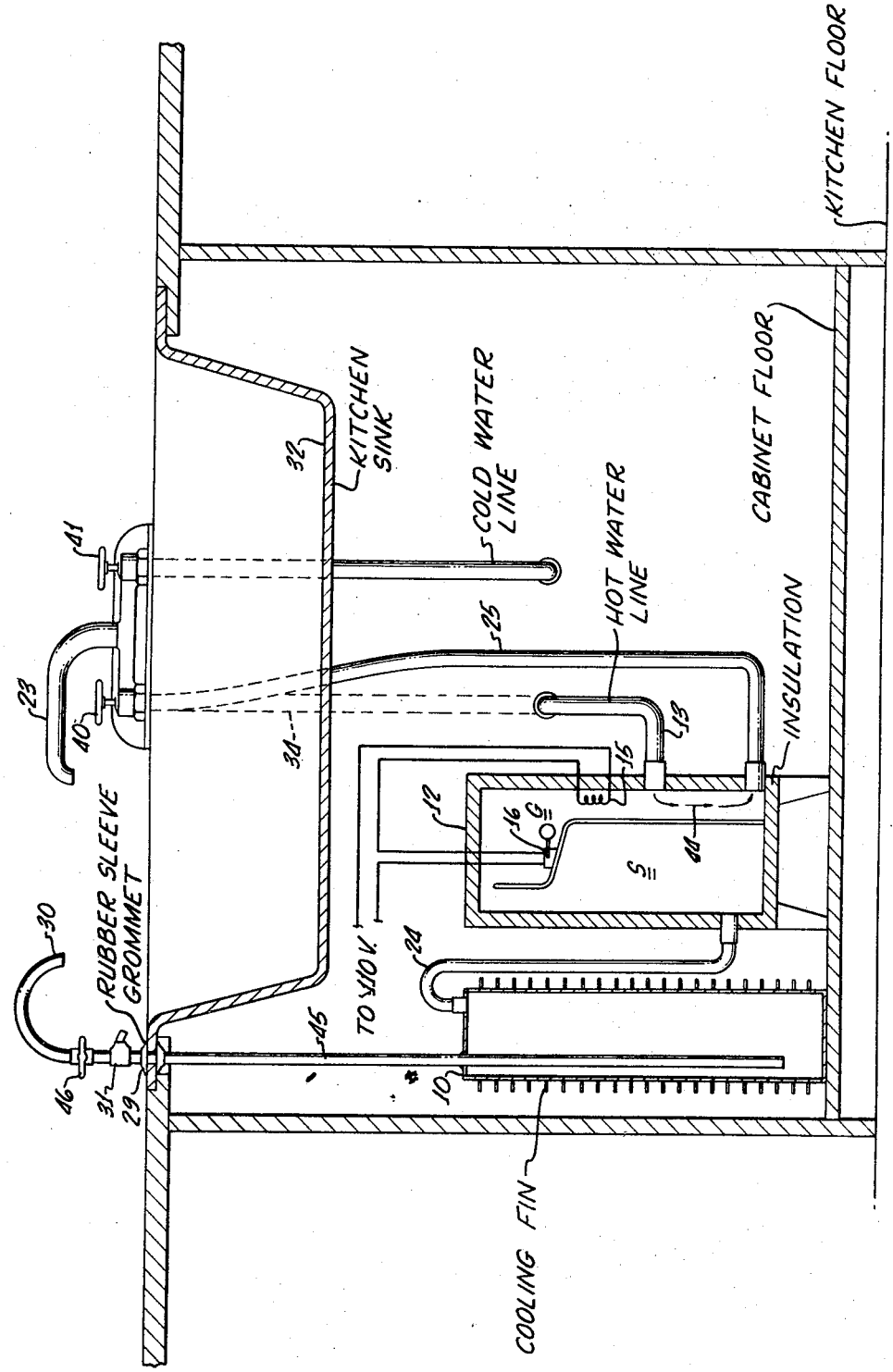
FIG. 1 is a preferred embodiment of household distillation system installed beneath the kitchen sink.

Adverting to the drawings, and particularly to FIG. 1, a preferred embodiment of the invention comprises a reservoir 10 for storing the distilled water and a thermally insulated boiler 12 which is directly connected via the pipe 13 to the household hot water line. The boiler 12 itself is divided into two portions, namely the generator section G and storage section S. The generator section G includes a heating element 15 and level detecting switch 16 which together function (in a manner to be described below) to maintain pressure/volume equilibrium. The output of the generator section of the boiler 12 is connected to sink spigot 23 (via pipe 25) and the output of the storage section is connected (via pipe 24) to the reservoir 10. A preferred embodiment of the invention also includes a distilled water tap 30 above the sink level and an excess pressure release valve 31 which is designed to automatically open if the internal pressure should exceed some predetermined safe limit.

The hot and cold water valves 40 and 41 operate as originally intended—to control the quantity and temperature of water flow from the sink spigot 23. The hot water, however, passes through the generator section of the boiler 12 as indicated by the arrow 44 instead of flowing directly to the hot water spigot valve 40 as it did (dotted pipe 34) prior to installing the distillation system. Valve 40 thus functions not only in its original capacity but in addition, it provides a convenient tap for flushing brine from the boiler. In the normal course of using the sink, valve 40 will be opened from time to time, and in each instance the suspended residue in the generator section G of the boiler will be discharged. Where the hot water valve 40 in the sink is not frequently used, it should be opened occasionally to prevent the build up of a high concentration of impurities within the boiler.

The level detecting switch 16 is preferably a mercury switch having an attached float which causes the switch 16 to tilt up or down depending upon the water level in the generator portion G of the boiler 12. When the switch tilts downwardly (water level low) the mercury breaks contact whereas a high water level causes the switch to tilt so that the mercury closes the contacts. Since the switch 16 is connected in series with the heater element 15, power will only be applied to the heater 15 when the water level is above the level of the switch 16. The heater 15 should have a low thermal mass and be designed to produce a boiling temperature immediately after switch 16 conducts.

The boiler 12 and reservoir 10 are typically tin lined steel vessels capable of withstanding pressures on the order of 250 p.s.i. The boiler 12 is completely insulated to prevent heat transfer to the surroundings. Reservoir 10 utilizes external cooling fins to optimize heat transfer to the ambient. The capacity of the storage part S of boiler 12 and reservoir 10 are approximately the same (about 6 quarts for a typical family). Output from reservoir 10 is through the pipe 45 to tap 30, from which a user may fill, for example, a drinking glass or a refrigerator water vessel upon opening valve 46. The only modification required to install the distilled tap 30 above the sink as shown, is the drilling of the hole 29 to accommodate pipe 45.

Figure 2:
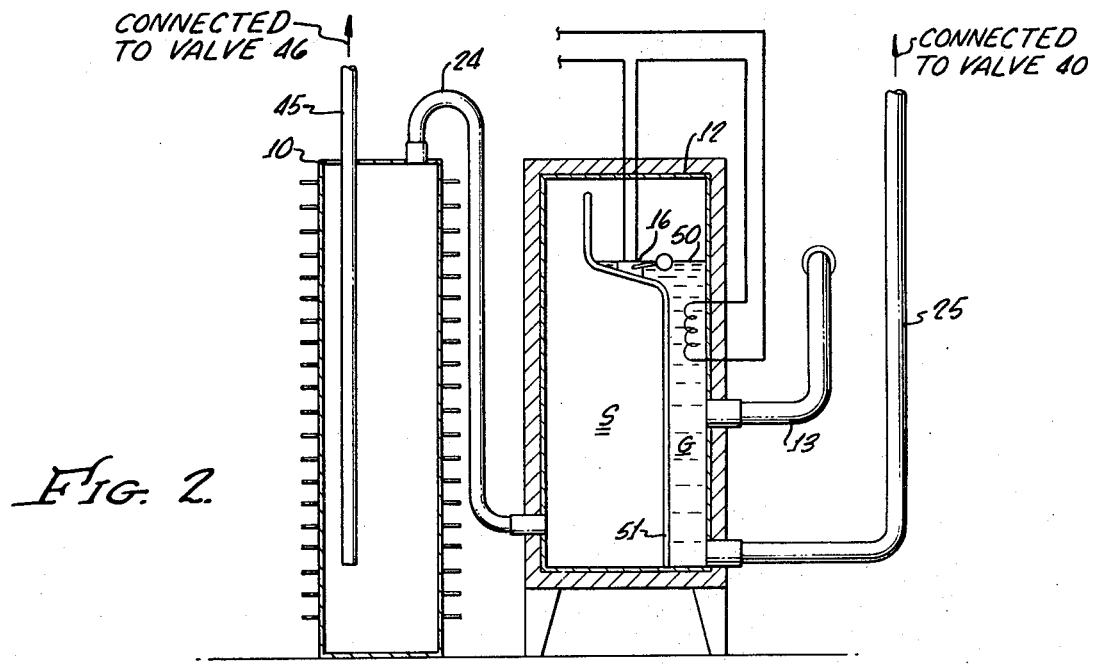

FIG. 2 illustrates the initial condition of the elements prior to the normal distillation sequence. Prior to turning on the water, both the reservoir 10 and boiler 12 are empty so that switch 16 is in the non-conducting state. When water is turned on it enters through pipe 13 and the generator section G of the boiler 12 begins to fill until the water level reaches switch 16 as indicated by the line 50. This causes switch 16 to close so that power is applied to the heater 15. The heater 15 causes the water in the narrow part of the generator to boil. If the flow rate of water entering the generator section G is greater than the rate at which water contiguous to the heater 15 is converted to steam, the water level will continue to rise above the line 50 and will eventually spill over the partition 51 to fill both the storage section S and the reservoir 10. In such a case, this undistilled water should be drawn off by opening valve 46. When this is done the system operates in its intended fashion, i.e., it produces distilled water to replace that which has been used. If, on the other hand, the quantity of the water entering the generator G is less than the rate at which water can be converted to steam by the heater 15, the water will not rise above the line 50 to flow into section S or reservoir 10. In such a case it is obviously unnecessary to draw water from the reservoir to initially put the system in an operative state.

Figure 3:
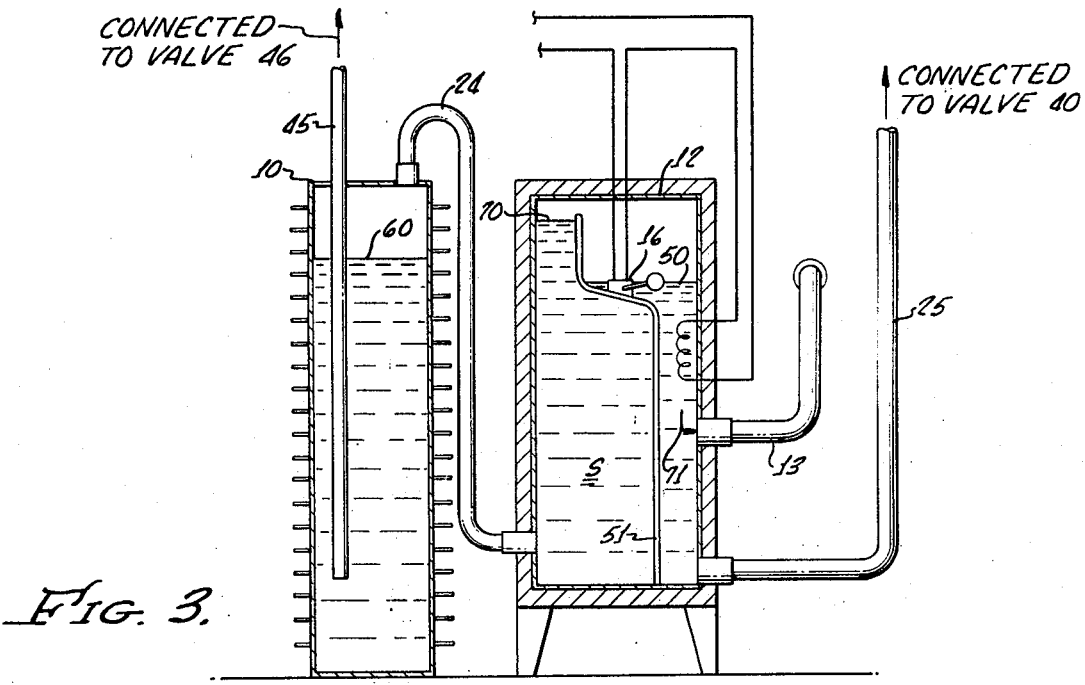
FIG. 3 shows the water and steam relationship in each element after the system has operated until equilibrium is achieved.

FIG. 3 shows the states of the various elements after the system has operated until equilibrium is established—the steam produced in the generator has condensed in both the reservoir 10 and storage section S as indicated by the water levels 60 and 70 respectively. The area above switch 16 is occupied by steam and the area above the water level 60 is occupied by trapped air. With the valve 46 shut off—the system is closed to the atmosphere so that the pressure in the reservoir 10 and boiler 12 is equal to the household water pressure (i.e. the pressure in pipe 13). Hence, tap water will not enter the generator G from pipe 13 nor will water flow through pipe 24 or 25 if the valves 40 and 46 are closed. If the water level 50 is slightly below switch 16 the power to the heater 15 will be shut off and the boiler will begin to cool down. This causes the steam in the boiler to condense with a consequent loss of vapor pressure in the boiler. More water will then enter the generator through pipe 13 (and distilled water may spill over the partition 51 if the storage portion S of the boiler is full) resulting in a rise in the generator water level 50. When the steam pressure has decreased to a point where the water level 50 causes the switch 16 to conduct, the heating element 15 will be energized to produce additional steam. The increased vapor pressure drives water out of the generator G into the household water line 13 as indicated by the arrow 71, thus lowering the level 50 until the switch 16 opens. The cycle will then repeat itself and so on, the period of repetition being determined by the thermal parameters of the boiler 12 and heater 15.

Figure 4:
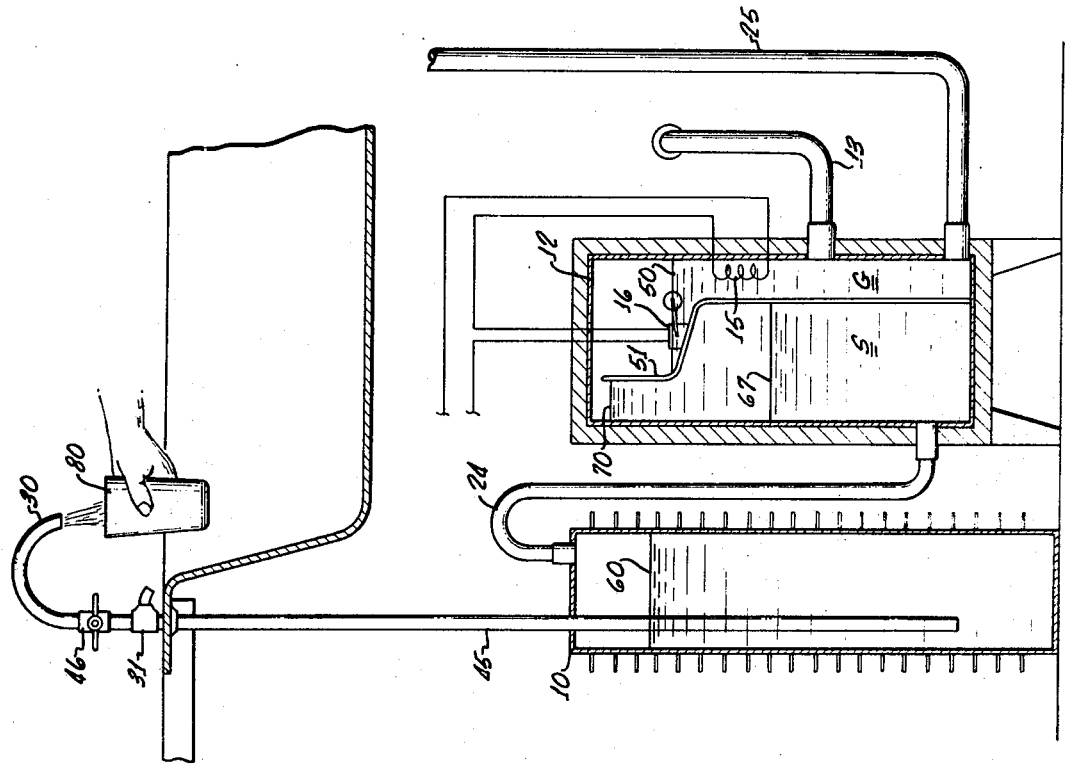
FIG. 4 shows what happens to the various water levels when distilled water is drawn from the system.

FIG. 4 shows what happens when distilled water is drawn from the tap 30. When the valve 46 is opened, water is discharged into a receptacle 80 resulting in a decrease in the water level and pressure within reservoir 10. This allows warm water from the storage part S of the boiler to flow through pipe 24 to refill the reservoir 10 to its original level 60. When water flows from the storage part S of the boiler 12 to the reservoir 10, the pressure within the boiler decreases; more water enters the generator G through pipe 13 causing the water level 50 to rise. The heater will be energized by switch 16 to generate additional steam to occupy more volume. Hence, as the water level 70 falls, the volume occupied by the steam must increase accordingly. Switch 16 will thus cycle rapidly on and off so as to regulate the water level 50, provided that the heating element 15 has the capability of producing steam at a rate which is equal to, or in excess of, that required to maintain constant pressure as the steam phase volume increases due to discharge of water from tap 30. If the heater 15 cannot produce steam rapidly enough, the pressure in the boiler 12 and reservoir 10 will decrease allowing the water level 50 to rise until it spills over partition 51. This, of course, is undesirable since the tap water in the generator G will then mix with the distilled water in the storage portion S thus reducing the purity of the stored water.

Because of the importance of isolating the tap water from the distilled water, the boiler is structured so that the storage portion is maintained at an elevated temperature. As a consequence the steam which flows over the partition 51 to occupy the displacement volume above the decreasing level 70 does not condense immediately, that is, only a small amount of water needs to be converted to steam in order to maintain the boiler pressure as water is drawn from the tap 30. If the generator G were connected directly to reservoir 10 (with no intermediate storage S) steam rather than water would enter reservoir 10 when the valve 46 is opened. The cold temperature in the reservoir will cause the steam to condense almost as rapidly as it enters, and the heater 15, in order to maintain pressure, would be required to convert water to steam at a much higher rate. Furthermore, the latent heat of condensation is wasted to produce an unwanted temperature increase of the cool water when the condensation occurs in the reservoir 10, whereas the heat produced by condensation within the thermally insulated boiler 12 is retained so that the average power supplied from the 110 volt household line to maintain the liquid vapor equilibrium within the generator portion G is considerably less.

A numerical example using typical figures is useful in determining the approximate power which the heater is required to supply in order to maintain system pressure while distilled water is drawn off. Thus, for a 65 lb. pressure water line (80 lbs. absolute) the change in volume (using the standard steam tables given on p. 490 of "Thermodynamics" by John Lee and Francis Sears, Addison-Wesley, Cambridge, Mass., 1955) when the water is converted to steam is:

$$\Delta V = \frac{5.472}{0.017} = 320$$

the vaporization occurring at a temperature of 312.03° F. From the same table, the amount of energy required to convert water to steam is the latent heat of vaporization, i.e., $Q = 901.1$ B.t.u./lbm. at 80 p.s.i.

If the user were to draw pure water at a rate of 5 lbm. in 10 seconds, water would have to be converted to steam at the same rate.

$$\text{Rate} = \frac{5 \text{ lbm.}}{10 \text{ sec.}} \times \frac{1}{320}$$

$$= 1.56 \times 10^{-3} \text{ lbm./sec.}$$

And therefore, heat must be supplied at the rate of $$\frac{Q}{t} = \frac{1.56 \times 10^{-3} \text{ lbm.}}{\text{sec.}} \times 901.1 \frac{\text{B.t.u.}}{\text{lbm.}}$$

$$= 1420 \times 10^{-3} \frac{\text{B.t.u.}}{\text{sec.}} \times 1055 \frac{\text{Joules}}{\text{B.t.u.}}$$

1500 watts

Hence, a heater capable of supplying 1500 watts is required. If, however, the discharge rate is restricted to 2½ lbm. in 10 seconds, a 750 watt heater will suffice. A valve or restrictor of some type can, of course be used to restrict water flow to some value less than the rate at which the heater 15 is capable of producing steam (see the embodiment shown in FIG. 7).

After tap 30 is closed, the water in S will be at some new level, for example, the line 67 shown in FIG. 4. The volume above the levels 67 and 50 is filled with steam and the area above level 60 is filled with compressed air. The pressure is equal to the household water pressure in pipe 13. Since the storage portion S is slightly cooler than the generator portion (being further removed from the heat source 15) the steam above the level 67 will slowly condense. This condensing steam causes the water level 67 to rise, thus increasing the quantity of distilled water in S. As the steam condenses, the pressure drops, allowing additional water to enter through pipe 13. When the level 50 is above switch 16, the heater is energized to produce additional steam, this process continuing until the water level in S is restored to its maximum level 70, at which point the system functions to maintain the pressure/volume equilibrium as previously described in connection with FIG. 3.

The level of water 60 within the reservoir will change from time to time depending upon the air solubility. This factor is dependent upon both pressure and temperature. After a period of use, the trapped air will eventually be absorbed so that reservoir 10 will normally be completely full of water. Since the pressure for discharging water from tap 30 is provided by the pressure within the boiler, the air-liquid-volume ratio in reservoir 10 has no bearing on the system operation.

Although in the present system it is necessary to intermittently apply thermal power to maintain the pressure and phase equilibrium, the amount of energy expended is minimal. When water is not being drawn from tap 30, the only heat loss is through the pipe 24. Since the conducting cross sectional area of this pipe 24 will typically be less than ½ inch, the quantity of heat leaving the boiler is quite small. Where, however, it is desired to accomplish the distillation function without using the heater to maintain system pressure, several alternatives are available. Thus, in the embodiment shown in FIG. 5a, a check valve 100 is used to regulate the water level in the heating chamber 101 (the round ball 106 floats on top of the water to move valve 100 so as to seal off pipe 102 whenever the water level in the heating chamber is high). Power is applied to the heater 103 whenever the level 108 falls below the level detecting switch 104 whereas a water level above switch 104 causes power to be applied to the pump 199 until the pressure reaches some predetermined value at which time pressure switch 112 opens.

FIG. 5b shows how the same result can be achieved using a tank of compressed air 150, a simple regulator 160, a pressure switch 165, and a level detecting switch 170. In this embodiment the air tank 150 and regulator 160 function to maintain the pressure within the heating chamber 180 and reservoir 190 at a pressure above atmosphere, but less than the water line pressure. For example, if the water line pressure is 75 lbs./in.² absolute, the regulator spring may be adjusted to release air from the tank 150 whenever the pressure within the heating chamber 180 (and reservoir 190) falls below 45 lbs./absolute. Heat is only applied when the reservoir pressure is below the pressure at which switch 160 is set. Heat is shut off by switch 170 after the water level 303 has risen to the level detector switch 170, at which point system pressure is maintained by the pressure tank 150 and regulator 160.

Figure 5A:
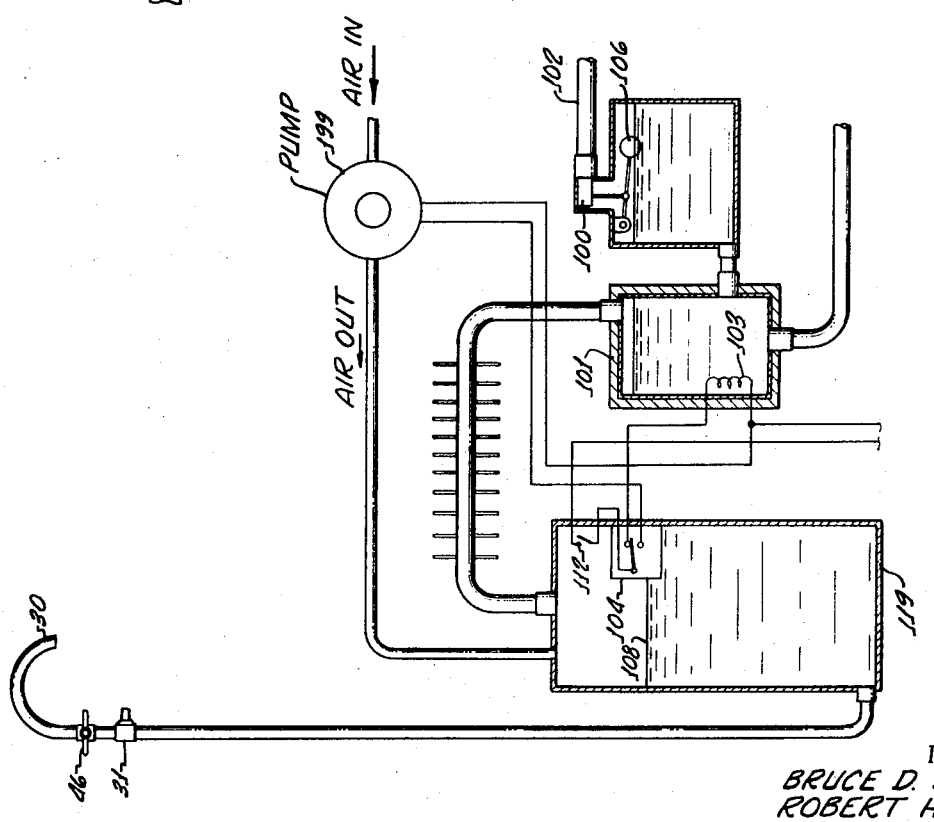
FIG. 5a shows an alternative embodiment of the system employing an air pump to maintain equilibrium pressure.

The system shown in FIG. 5a or 5b can also be adapted to use a heating element 103 to maintain pressure as previously described (in which case the air pump and level switch can be eliminated from the system of FIG. 5a, and the regulator and tank can be eliminated from the system of FIG. 5b) with the heater controlled by the pressure switch. This embodiment is shown in FIG. 6. An intermediate storage tank between the heating chamber 113 and reservoir 114 can also be used, but is not required from the standpoint of preventing the heating chamber water from mixing with the distilled water when the latter is drawn off since it is the check valve 100, rather than the heating chamber pressure, which determines the water level in the heating chamber. If intermediate storage is used, it can take the form of a separate tank or a divided portion of the heating chamber as illustrated in FIGS. 1–4.

Figure 7:
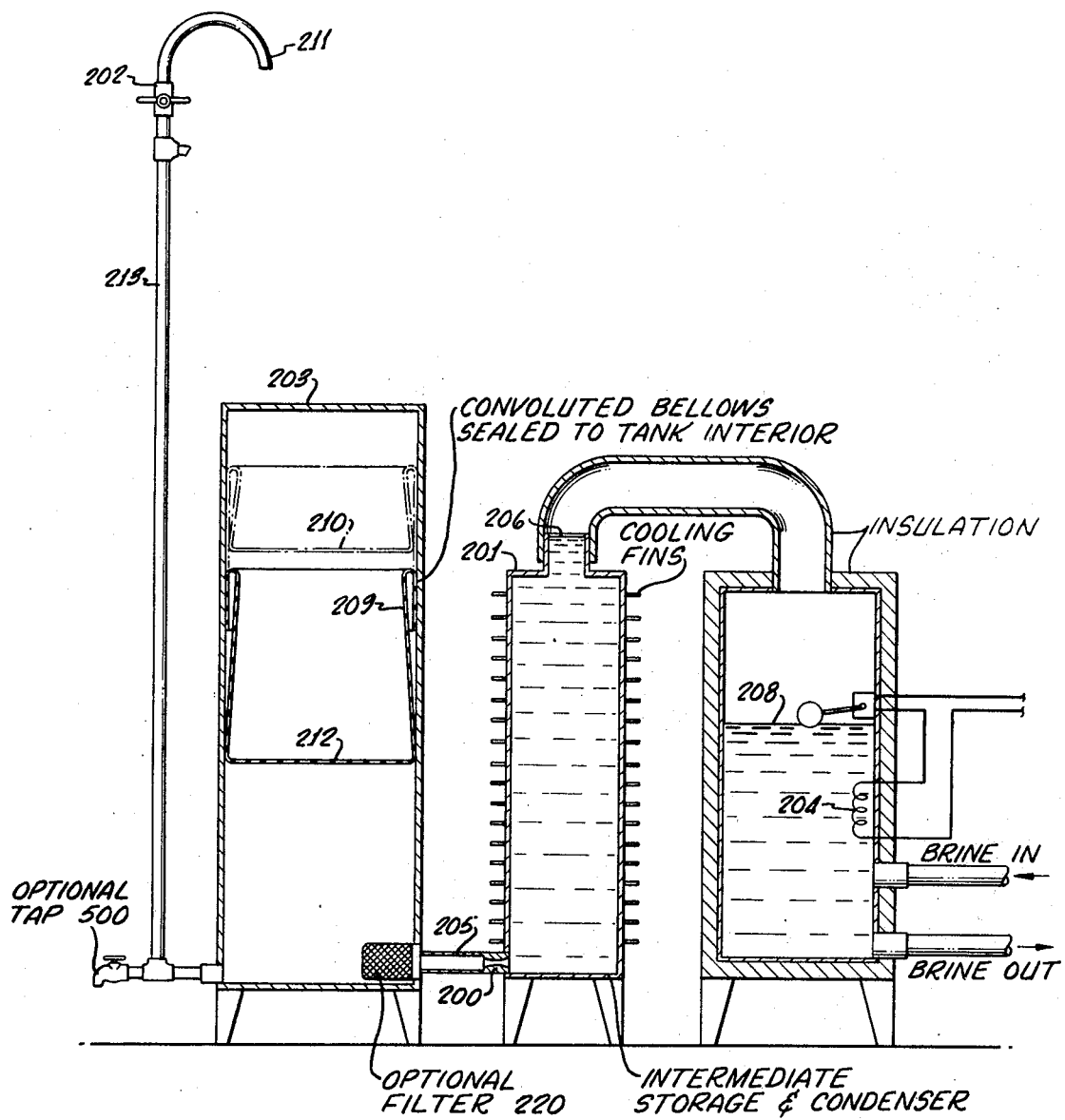
FIG. 7 shows how the thermal requirements of the heater in a steam maintained pressure system may be lowered by limiting the water flow from the intermediate storage tank without impairing the rate at which water can be drawn from the reservoir.

Another embodiment of the invention is shown in FIG. 7. In this system a small restrictor 200 is used to limit the water flow from an intermediate storage tank 201 at a rate equal to (or less than) the rate at which steam can be produced by a low wattage heater 204. As a result, the water levels 206 and 208 remain unchanged even though water is drawn via valve 202 from the reservoir 203 at much greater rate. Convoluted bellows 209 are used to provide separation between the compressed air at the top of the reservoir 203 and the distilled water at the bottom in order to prevent the gradual absorption of the air into the water. Thus, if the bellows 209 are initially as shown in 210, the water will occupy the volume on the underside of the dotted line, whereas the area above the dotted line will be compressed air. When valve 202 is opened, water can be drawn from the spigot 211 at a rate greater than the rate at which water flows through the restrictor 200. As a result, the compressed air above the bellows expands to "take-up" the volume, for example the bellows may reach position 212. The expansion, of course, decreases the pressure available to lift water up the pipe 213 according to the familiar gas law for constant temperature, namely:

$$P_1 V_1 = P_2 V_2$$

where $P_1$ and $V_1$ are the initial pressure and volume and $P_2$ and $V_2$ are the final pressure and volume. Thus, for an initial pressure of 4 atmospheres, half of the water in reservoir 203 can be drawn off, and still leave a final pressure of two atmospheres. After the valve 202 is closed, the flow through pipe 205 gradually restores the bellows 209 to the initial position 210.

Further purification of the distilled water may be desired in some cases. Since one stage of distillation removes almost all of the common impurities, filtration subsequent to the distillation becomes an easy matter. Direct filtration of the incoming tap water (or brine as it is sometimes called) on the other hand, presents problems because the impurities tend to rapidly clog conventional filters. As a consequence, the filters must be frequently replaced. In the system shown in FIG. 7, however, a downstream filter 220 such as a reverse osmosis filter, may be used with the basic apparatus to remove certain toxic substances which may be transferred in the same manner as the water vapor. This filter may be designed to screw into the wall of reservoir 203 to facilitate replacement. In normal household applications however, additional filtering is not necessary since most of the common impurities consist of suspended solids, and the distillation process is capable of reducing a suspended solid impurity concentration of 800 to 1000 p.p.m. to something less than 5 to 10 p.p.m.

In the embodiment shown in FIG. 7, the reservoir 10 is also provided with an additional tap 500. This can be used to completely drain the system and/or to draw off distilled water where the reservoir is mounted above the floor level. In such an installation the pipe 13 can be eliminated as well as the convoluted bellows, there being no internal pressure required to discharge water from a tap 500 which is located below the water level in the reservoir 203.

All of the control devices such as heaters, filters, and electrical switches, should be designed to screw into the walls of the various vessels. Such an arrangement permits convenient replacement should any of these elements fail. While the heaters are illustrated as operating from the 110 household current, it will be obvious that 220 volt power (or a gas operated heater) would work equally well.

The basic concept of the invention is, of course, not limited to installation under the kitchen sink, or for that matter, household applications in general. It may be used commercially, for example, to provide good, clean drinking water for employees. It may be used in vending machines for those unable to afford the small cost of their own private systems. It may be used in industrial applications to provide purification ahead of filtration, and subsequent distillation. Nor is the basic concept of the invention restricted to the preferred embodiment and other embodiments disclosed herein, and while these embodiments illustrate a simple, inexpensive and convenient water distillation system for the home, it will be understood that the invention is not limited thereto, and that numerous changes, modifications and substitutions may be made without departing from the spirit of the invention.

We claim:

1. A closed system for distilling water from a household tap water line comprising:
    a chamber for heating water;
    means for condensing the water vapor produced in said heating chamber;
    a reservoir for storing the condensed vapor;
    means for producing an internal pressure within said heating chamber which is greater than the external atmospheric pressure;
    means for mounting said heating chamber and said reservoir underneath a household sink;
    means for connecting said heating chamber to the hot water line beneath the kitchen sink whereby water may be supplied to said boiler;
    means for connecting said heating chamber to the sink spigot hot water valve whereby residue may be flushed from the boiler through the sink spigot into the sink drain; and
    means for regulating the water level within said heating chamber so as to prevent the tap water from mixing with the water stored in said reservoir.

2. The apparatus recited in claim 1 wherein is included:
    a means for producing an internal pressure within said reservoir which is greater than the external atmospheric pressure;
    a valve operated distilled water spigot positioned above the sink; and
    means connecting said valve operated distilled water spigot to said reservoir whereby distilled water may be drawn from said spigot upon opening said valve.

3. The apparatus recited in claim 1 wherein said means for regulating the water level within said heating chamber and said means for producing an internal pressure within said heating chamber comprises:
    means for heating the water within said heating chamber to steam temperature;
    means for detecting the water level within said heating chamber; and
    means responsive to said means for detecting the water level for energizing said heating means when the water in said heating chamber is above a predetermined level whereby water in said heating chamber will be converted to steam so as to increase the pressure within said heating chamber until it exceeds the pressure in the household hot water line whereby water will be forced from said heating chamber into the household hot water line.

4. The apparatus recited in claim 3 wherein is included:
    a means for producing an internal pressure within said reservoir which is greater than the external atmospheric pressure;
    a valve operated distilled water spigot positioned above the sink; and
    means connecting said valve operated distilled water spigot to said reservoir whereby distilled water may be drawn from said spigot upon opening said valve.

5. The apparatus recited in claim 4 wherein is included: restrictive passage means for limiting the rate at which the condensed water vapor enters said reservoir whereby distilled water may be drawn from said reservoir at a rate independent of the rate at which water is converted to steam by said heating means and without impairing the regulation of water level and pressure within said heating chamber.

6. The apparatus recited in claim 5 wherein said means for producing an internal pressure within said reservoir which is greater than the external atmospheric pressure comprises a convoluted bellows having a sealed upper chamber of compressed gas.

References Cited

UNITED STATES PATENTS

| | | | |
|---|---|---|---|
| 456,922 | 7/1891 | Barnstead | 202—196 |
| 1,231,857 | 7/1917 | Crispell | 202—181 X |
| 2,473,737 | 6/1949 | Storment | 202—206 X |
| 1,864,021 | 6/1932 | Jack | 202—206 X |
| 3,055,810 | 9/1962 | Skow | 202—206 X |
| 3,269,919 | 8/1966 | Baily et al. | 202—206 X |
| 835,886 | 11/1906 | Gunn | 203—11 |
| 3,532,606 | 10/1970 | Sibert | 202—181 X |
| 1,183,142 | 5/1916 | Underwood | 203—11 |
| 1,635,112 | 7/1927 | Carlson et al. | 203—10 X |

NORMAN YUDKOFF, Primary Examiner

D. EDWARDS, Assistant Examiner

U.S. Cl. X.R.

202—185 B, 206; 203—11, 2